United States Patent
Filippo et al.

(10) Patent No.: US 7,321,964 B2
(45) Date of Patent: Jan. 22, 2008

(54) STORE-TO-LOAD FORWARDING BUFFER USING INDEXED LOOKUP

(75) Inventors: Michael A. Filippo, Manchaca, TX (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 478 days.

(21) Appl. No.: 10/615,101

(22) Filed: Jul. 8, 2003

(65) Prior Publication Data

US 2005/0010744 A1    Jan. 13, 2005

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/225
(58) Field of Classification Search ................. 712/225
See application file for complete search history.

(56) References Cited

U.S. PATENT DOCUMENTS

| | | | |
|---|---|---|---|
| 4,521,851 A | 6/1985 | Trubisky et al. |
| 4,594,660 A | 6/1986 | Guenthner et al. |
| 5,276,828 A | 1/1994 | Dion |
| 5,404,470 A | 4/1995 | Miyake |
| 5,440,752 A | 8/1995 | Lentz et al. |
| 5,465,336 A | 11/1995 | Imai et al. |
| 5,467,473 A | 11/1995 | Kahle et al. |
| 5,487,156 A | 1/1996 | Popescu et al. |
| 5,490,259 A | 2/1996 | Hiraoka et al. |
| 5,555,432 A | 9/1996 | Hinton et al. |
| 5,557,763 A | 9/1996 | Senter et al. |
| 5,606,670 A | 2/1997 | Abramson et al. |
| 5,619,662 A | 4/1997 | Steely, Jr. et al. |
| 5,625,835 A | 4/1997 | Ebcioglu et al. |
| 5,651,125 A | 7/1997 | Witt et al. |

(Continued)

FOREIGN PATENT DOCUMENTS

EP    709 770    5/1996

(Continued)

OTHER PUBLICATIONS

Hennessy, J. L., Patterson, D. A. Computer Organization and Design. Morgan Kaufmann Publishers, Inc.: 1998. pp. 549-550.*

(Continued)

*Primary Examiner*—Richard L. Ellis
*Assistant Examiner*—Brian P Johnson
(74) *Attorney, Agent, or Firm*—Robert C. Kowert; Meyertons, Hood, Kivlin, Kowert & Goetzel, P.C.

(57) ABSTRACT

A microprocessor may include a dispatch unit configured to dispatch load and store operations and a load store unit configured to store information associated with load and store operations dispatched by the dispatch unit. The load store unit includes a STLF (Store-to-Load Forwarding) buffer that includes a plurality of entries. The load store unit is configured to generate an index dependent on at least a portion of an address of a load operation, to use the index to select one of the plurality of entries, and to forward data included in the one of the plurality of entries as a result of the load operation.

31 Claims, 6 Drawing Sheets

U.S. PATENT DOCUMENTS

| | | |
|---|---|---|
| 5,652,859 A | 7/1997 | Mulla et al. |
| 5,655,096 A | 8/1997 | Branigin |
| 5,710,902 A | 1/1998 | Sheaffer et al. |
| 5,717,883 A | 2/1998 | Sager |
| 5,724,536 A | 3/1998 | Abramson et al. |
| 5,742,791 A | 4/1998 | Mahalingaiah et al. |
| 5,748,978 A | 5/1998 | Narayan et al. |
| 5,751,983 A | 5/1998 | Abramson et al. |
| 5,751,985 A | 5/1998 | Shen et al. |
| 5,761,712 A | 6/1998 | Tran et al. |
| 5,768,555 A | 6/1998 | Tran et al. |
| 5,778,219 A | 7/1998 | Amerson et al. |
| 5,781,752 A | 7/1998 | Moshovos et al. |
| 5,781,790 A | 7/1998 | Abramson et al. |
| 5,794,029 A | 8/1998 | Babaian et al. |
| 5,799,165 A | 8/1998 | Favor et al. |
| 5,802,575 A | 9/1998 | Greenley et al. |
| 5,802,588 A | 9/1998 | Ramagopal et al. |
| 5,832,297 A | 11/1998 | Ramagopal et al. |
| 5,835,747 A | 11/1998 | Trull |
| 5,850,533 A | 12/1998 | Panwar et al. |
| 5,884,059 A | 3/1999 | Favor et al. |
| 5,884,060 A | 3/1999 | Vegesna et al. |
| 5,884,061 A | 3/1999 | Hesson et al. |
| 5,887,152 A | 3/1999 | Tran |
| 5,915,117 A | 6/1999 | Ross et al. |
| 5,923,862 A | 7/1999 | Nguyen et al. |
| 5,941,983 A | 8/1999 | Gupta et al. |
| 5,978,900 A | 11/1999 | Liu et al. |
| 5,987,594 A | 11/1999 | Panwar et al. |
| 5,996,068 A | 11/1999 | Dwyer, III et al. |
| 6,016,540 A | 1/2000 | Zaidi et al. |
| 6,065,105 A | 5/2000 | Zaidi et al. |
| 6,070,238 A | 5/2000 | Feiste et al. |
| 6,076,153 A | 6/2000 | Grochowski et al. |
| 6,098,166 A | 8/2000 | Leibholz et al. |
| 6,108,769 A | 8/2000 | Chinnakonda et al. |
| 6,108,770 A | 8/2000 | Chrysos et al. |
| 6,122,727 A | 9/2000 | Witt |
| 6,212,622 B1 | 4/2001 | Witt |
| 6,212,623 B1 | 4/2001 | Witt |
| 6,266,744 B1 | 7/2001 | Hughes et al. |
| 6,308,259 B1 | 10/2001 | Witt |
| 6,321,328 B1 | 11/2001 | Karp et al. |
| 6,336,178 B1 | 1/2002 | Favor |
| 6,360,314 B1 * | 3/2002 | Webb et al. ................ 712/219 |
| 6,393,536 B1 | 5/2002 | Hughes et al. |
| 6,502,185 B1 | 12/2002 | Keller et al. |
| 6,542,984 B1 | 4/2003 | Keller et al. |
| 6,549,990 B2 * | 4/2003 | Hughes et al. ............... 711/146 |
| 6,622,235 B1 | 9/2003 | Keller et al. |
| 6,622,237 B1 | 9/2003 | Keller et al. |
| 6,651,161 B1 | 11/2003 | Keller et al. |
| 6,694,424 B1 | 2/2004 | Keller et al. |

FOREIGN PATENT DOCUMENTS

| | | |
|---|---|---|
| GB | 2 281 422 | 3/1995 |
| WO | 96/12227 | 4/1996 |
| WO | 97/27538 | 7/1997 |
| WO | 00/11548 | 3/2000 |
| WO | WO 01/35212 | 5/2001 |

OTHER PUBLICATIONS

Moshovos, et al., "Dynamic Speculation and Synchronization of Data Dependences," ACM, Published Jun. 2, 1997, XP-000738156, pp. 181-193.

Chrysos, et al., "Memory Dependence Prediction Using Store Sets," IEEE, Published Jun. 27, 1998, XP-000849912, pp. 142-153.

Leibholz, et al., "The Alpha 21264: A 500MHz Out-of-Order Execution Microprocessor," IEEE, published Feb. 23, 1997, XP-000751757, pp. 28-36.

Popescu, et al., "The Metaflow Architecture," IEEE Micro, Jun. 1991, pp. 10-13 and 63-73.

Gwennap, "Digital 21264 Sets New Standard," Microprocessor Forum, vol. 10, No. 14, Microdesign Resources, Oct. 28, 1996, pp. 103-108.

Mike Johnson, "Superscalar Microprocessor Design," Advanced Micro Devices, Prentice Hall 1991, pp. 130-132, 147-163.

Moshovos, et al., "Streamlining Inter-operation Memory Communication via Data Dependence Prediction," IEEE Proceedings of Micro-30, Dec. 1997, 11 pages.

Moshovos, et al., "Speculative Memory Cloaking and Bypassing," Oct. 1999, 15 pages.

Gopal, et al., "Speculative Versioning Cache," Feb. 1998, 11 pages.

International Search Report for PCT/US2004/017093, mailed Nov. 24, 2005, 10 pages.

* cited by examiner

STORE-TO-LOAD FORWARDING BUFFER USING INDEXED LOOKUP

BACKGROUND OF THE INVENTION

1. Field of the Invention

This invention is related to the field of microprocessors and, more particularly, to performing store-to-load forwarding (STLF) in a microprocessor.

2. Description of the Related Art

In high-performance microprocessors, the load store unit typically contains storage for several outstanding load and store operations waiting to access L1 cache. A common performance enhancement that can be applied to this type of microprocessor architecture is to implement a mechanism for forwarding data from older store operations (store operations that occur earlier in program order) to younger load operations (load operations that occur later in program order).

This store-to-load forwarding of data significantly improves execution efficiency by circumventing accesses to the L1 data cache. The method by which STLF is typically achieved is to search all older store operations while the load operation is in the data cache access stage of the execution pipeline. The address of the load operation is compared with the addresses of all the store operations resident in the load store unit. First, all store operations that target the same address as the load operation are identified and then this grouping is refined by eliminating any store operations that are younger than the load operation. Once all the store operations that are older than the load operation have been identified, the relative ages of these store operations are compared to find the youngest store operation that is older than the load operation. The data associated with this youngest store operation is then forwarded to the load operation allowing it to complete normally without the need to access the L1 data cache.

The address comparisons and searching algorithms used to locate the youngest store operation with the same target address as the load operation are relatively complex and require many levels of combinatorial logic for implementation. Typically the load store unit stores operations waiting to complete by accessing L1. Each line of this storage contains multiple entries for load or store operations. When the address of a load operation becomes available, it must be compared to the address of each entry and all matching entries must be verified as store operations. Once all store operation entries matching the load operation's targeted address have been identified, a find-first algorithm may be employed to identify the youngest matching store operation that is older than the load operation. The data from the appropriate entry may then be forwarded to the load operation.

For high-performance microprocessors, this STLF functionality is typically a part of the critical path for completion of load operations, and therefore significantly impacts effective load latency. The time taken to perform each of the procedures outlined above contributes to this effective load latency, and in some instances, may limit the maximum frequency at which the microprocessor can operate.

SUMMARY

Various embodiments of methods and systems for performing indexed store-to-load forwarding are disclosed. In one embodiment, a microprocessor may include a dispatch unit configured to dispatch load and store operations and a load store unit configured to store information associated with load and store operations dispatched by the dispatch unit. The load store unit includes a STLF (Store-to-Load Forwarding) buffer that includes a plurality of entries. The load store unit is configured to generate an index dependent on an address of a load operation, to use the index to select one of the plurality of entries, and to forward data included in the one of the plurality of entries as a result of the load operation. The selected one of the plurality of entries in the STLF buffer may be configured to store an address, data, and a data size associated with a store operation. The index may be generated from all or part of the address bits included in the address. The address may be a physical or virtual address. A microprocessor including an indexed STLF buffer may be included in a computer system.

In one embodiment, the load store unit may be configured to not forward the data included in the one of the plurality of entries as the result of the load operation if information included in the one of the plurality of entries does not match information associated with the load operation.

The load store unit may be configured to select which one of the plurality of entries to allocate to a store operation by generating an additional index dependent on at least a portion of an address of the store operation. In some embodiments, the load store unit may be configured to generate the additional index dependent on both the address of the store operation and a number of bytes of data operated on by the store operation. Similarly, the load store unit may be configured to generate the index for the load operation dependent on both the address of the load operation and a number of bytes of data operated on by the load operation. In one embodiment, the additional index may be generated by right-shifting a lower portion of the address targeted by the store operation by an amount equal to a logarithm in base two of the number of bytes of data operated on by the store operation.

The load store unit may include a STLF checker configured to verify operation of the STLF buffer. The STLF checker may be configured to perform an associative address comparison to identify all issued store operations targeting a same address as the load operation and to implement a find-first algorithm to select a youngest issued store operation that is older than the load operation. The STLF checker may be configured to replay the load operation if the STLF checker identifies incorrect operation of the STLF buffer. The STLF checker may also be configured to replay one or more additional operations that are dependent on the load operation if the STLF checker detects incorrect operation of the STLF buffer. The load store unit may be configured to identify the result of the load operation as a speculative value in response to forwarding the data in the one of the plurality of entries included in the STLF buffer as the result of the load operation. If the STLF checker verifies that the STLF buffer operated correctly for the load operation, the load store unit is configured to indicate that the result of the load operation is not speculative.

BRIEF DESCRIPTION OF THE DRAWINGS

A better understanding of the present invention can be obtained when the following detailed description is considered in conjunction with the following drawings, in which.

Figure 1:
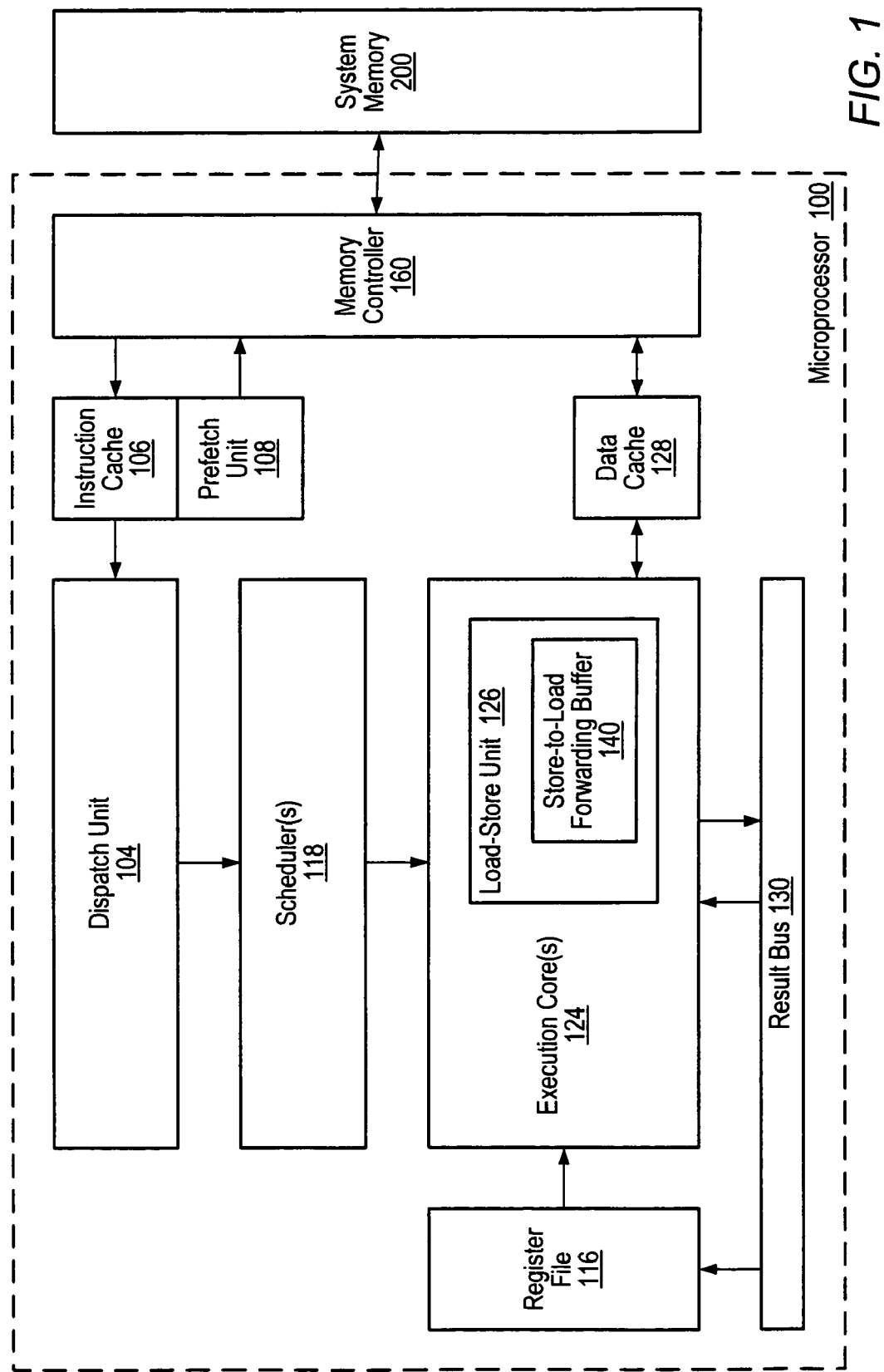
FIG. 1 shows a microprocessor that includes an STLF buffer, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in one embodiment of a microprocessor 100, which incorporates a store-to-load forwarding (STLF) buffer 140. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200. Similarly, microprocessor 100 may include a memory controller configured to control system memory 200 in some embodiments. Additionally, the interconnections between logical components may vary between embodiments.

Microprocessor 100 may include an instruction cache 106 and a data cache 128. Microprocessor 100 may include a prefetch unit 108 coupled to the system memory 200. Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Instructions may be fetched from system memory 200 in response to a given address missing in instruction cache 106.

A dispatch unit 104 may be configured to receive instructions from instruction cache 106 and to receive decoded and/or partially decoded operations from trace cache 160. The dispatch unit 104 may include a decode unit 140 to decode instructions received from instruction cache 106. The dispatch unit 104 may also include a microcode unit for use when handling microcoded instructions.

The dispatch unit 104 is configured to dispatch operations to scheduler(s) 118. One or more schedulers 118 may be coupled to receive dispatched operations from dispatch unit 104 and to issue operations to one or more execution cores 124. Execution core(s) 124 may include a load store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register). A register map may translate logical register names of source and destination operands to physical register names in order to facilitate register renaming. Such a register map may track which registers within register file 116 are currently allocated and unallocated.

When operations are handled by dispatch unit 104, if a required operand is a register location, register address information may be routed to a register map or a reorder buffer. For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Register file 116 may have one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 116) through load store unit 126. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load store unit 126.

Results produced by components within execution core(s) 124 may be output on the result bus 130 to the register file 116 if a register value is being updated. If the contents of a memory location are being changed, the results produced within execution core(s) 124 may be provided to the load store unit 126.

Load store unit 126 provides an interface between execution core(s) 124 and data cache 128. In one embodiment, load store unit 126 may be configured with a load store buffer with several storage locations for data and address information for pending loads or stores. The load store unit 126 may also perform dependency checking for load instructions against pending store instructions to ensure that data coherency is maintained.

Data cache 128 is a cache memory provided to temporarily store data being transferred between load store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Load Store Unit

Figure 2:
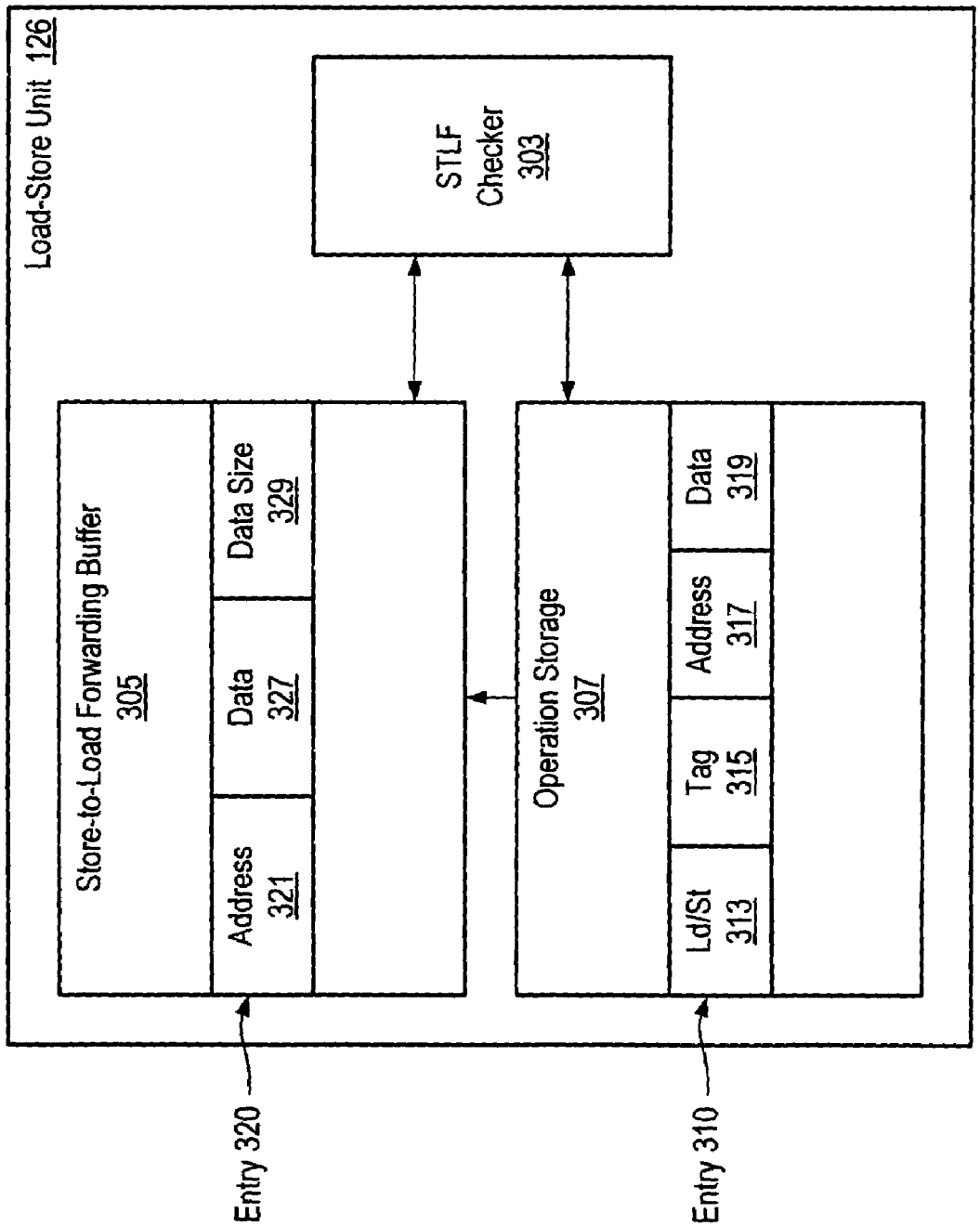
FIG. 2 shows a block diagram of a load store unit, according to one embodiment.

FIG. 2 illustrates a load store unit 126 that includes store-to-load forwarding (STLF) buffer 305, according to one embodiment. Load store unit 126 also includes operation storage 307 for outstanding operations that have been dispatched but that have not yet retired. Operation storage 307 may track all outstanding operations within the load store unit 126. Operation storage 307 may include an entry 310 for each dispatched load and each dispatched store.

An entry 310 may include information 313 indicating whether the entry is allocated to a load or store (or, in some embodiments, an entry may indicate that it includes both a load and a store if it corresponds to an operation that operates on a value loaded from a memory address and stores the result to a memory address). Additionally, an entry 310 may include a tag 315 (e.g., identifying the operation and/or its result within the microprocessor 100), an address 317, and/or data 319. An entry 310 may be allocated in response to dispatch unit 104 dispatching an operation and deallocated in response to retire queue 102 retiring the operation.

Each entry 320 in the STLF buffer 305 may be selected by a unique index. The load store unit 126 may generate an index from all or part of the address of an operation and use the index to select which entry to access for that operation. For example, the load store unit 126 may generate an index from a subset of the bits in the address. The address used may be a physical address or virtual address. In some embodiments, the index may also depend on the data size of the operation.

In some embodiments, when both the address and data for a store operation are available, the store operation becomes viable for having its data forwarded to a younger load operation targeting the same address. At that point, the load store unit may allocate an entry 320 in the STLF buffer 305 to the store operation. The load store unit 126 may select which entry 320 to allocate to a store operation by calculating an index from at least a portion of the store operation's address. The entry 320 selected by that index may be allocated to the store operation. An entry 320 in the STLF buffer 305 may include all or part of the address 321, data 327, and data size 329 (e.g., the number of bytes of data operated on by the store operation) of the store operation to which that entry is allocated. All entries in STLF buffer 305 may contain sufficient capacity to store the maximum amount of data that may be associated with a store operation.

Whenever a load operation's address becomes available, the load store unit 126 may generate an index based on all or part of the load's address in order to select an entry 320 within the STLF buffer 305. If address information 321 and/or data size information 329 included in the selected entry 320 matches address information and/or data size information associated with the load operation, the STLF buffer 305 may forward the data 327 in that entry as the result of the load operation. Note that a "match" may occur if the address information 321, data size information 329, and/or any other information included in the entry 320 at least partially matches the information associated with the load operation. For example, an entry may be considered a match in response to a subset or part of the entry's information matching information associated with a load. In other embodiments, matches may only occur if the entry's information fully matches the load's information.

In some embodiments, the index of an entry 320 may include the low order bits of an operation's address. In other embodiments, the index may be generated by performing some transformation function on the address of an operation. Indexes may be generated such that any given address and data size pair maps to a single index (note that the same index may be formed from multiple different addresses) in some embodiments. Accordingly, whenever a load operation's address is used to index into the STLF buffer 305, a single entry 320 will be selected. Using an indexed STLF buffer 305 may allow store-to-load forwarding to be performed in fewer cycles than would be required to perform store-to-load forwarding using a conventional STLF buffer.

In some embodiments, STLF buffer 305 may be of limited size and therefore, be capable of storing a limited number of entries relative to the number of operations stored in the operation storage 307 of the load store unit. This may result in conflicts for STLF buffer 305 entries 320 under certain conditions. For example, STLF buffer 305 may have a capacity to store sixteen entries corresponding to addresses 0x0h through 0xFh. An instruction sequence may result in the issuance of a series of store operations each storing four bytes of data. The series of store operations may target sequential memory addresses such that the first store operation targets address 0x00h, the second targets 0x04h, the third targets 0x08h, etc. In embodiments using a direct-mapped indexing method, the first four store operations may cause entries 320 in STLF buffer 305 to be generated at indexes 0x0h, 0x4h, 0x8h, and 0xCh. The next store operation in the series may target address 0x10h and the index generated for the entry 320 of this store operation may be 0x0h. Since this index is the same as that generated for the first store operation, which targeted address 0x00h, these load store unit 126 selects the same entry 320 in the STLF buffer for these two store operations.

Since the store operation having address 0x10h indexes the same entry as the store operation having address 0x00h, both store operations may not be represented in the STLF buffer at the same time, even though other entries in the STLF buffer 305 may not currently be allocated. If no entry is allocated in the STLF buffer 305 for the new store operation, then the load store unit 126 may not immediately forward data associated with the new store operation to a load operation targeting the same address. On the other hand, if the entry is allocated to the new store operation having address 0x10h, overwriting the information for the store operation having address 0x00h, the load store unit 126 may not immediately forward data associated with the old store operation to a load operation targeting the same address.

The potential for conflicts between a series of store operations that access consecutive addresses may be lessened by applying a hashing function or other transformation to addresses when generating indexes into the STLF buffer 305. In one embodiment, the load store unit 126 may form each index by right-shifting an operation's address by an amount equal to log2(data size). In the example given above, the application of this hashing function would translate the store operation targeting address 0x00h to an entry 320 at index 0x0h. For the store operation targeting address 0x04h, the load store unit 126 would allocate the entry at index 0x1h. Similarly, the load store unit would allocate the entry selected by index 0x2h to the store operation having address 0x08h. The store operation targeting address 0x10h, which previously conflicted with the store operation targeting address 0x00h, would be allocated the entry selected by an index of 0x4 and would no longer produce a conflict. Accordingly, the incorporation of a hashing function or other transformation into the generation of indices for entries 320 in STLF buffer 305 may increase the utilization of the storage capacity of the STLF buffer.

Transforming target addresses for load and store operations as described above to generate indices into STLF buffer 305 may allow entries allocated to multiple store operations to different bytes within the same maximal data size segment to simultaneously co-exist within STLF buffer 305. However, some loss of precision is experienced when the low-order bits are shifted out, and it may be necessary to compare both address 321 and data size 329 to determine a hit within STLF buffer 305. For example, entries for 2-byte store operations to addresses 0x00h, 0x02h, and 0x04h would coexist in STLF buffer 305 at index positions 0x0h, 0x1h, and 0x2h respectively. An attempt to match a 4-byte load operation targeting address 0x04h would produce an index into STLF buffer 305 of 0x1h at which a valid entry would be found, but since the store operation that produced the entry at 0x1h operated on only two bytes of data, the load store unit should produce a miss for this attempted match. Comparing both the addresses and data sizes of load operations with entries in STLF buffer 305 may preclude at least some erroneous matches.

In some embodiments, even when using transformations on addresses to generate indexes into STLF buffer 305, situations may arise in which two or more store operations map to the same STLF buffer entry 320. Under these conditions, the potential exists for a load operation targeting the same address as these store operations to forward data from the wrong store operation. In some embodiments in which the STLF buffer 305 may incorrectly forward data, the STLF buffer 305 may identify forwarded results as speculative. For example, a bit associated with the forwarded data may be set to indicate that the data is speculative. These results may be identified as speculative until verified by a verification mechanism such as STLF checker 303.

STLF checker 303 is a means of verifying the accuracy of STLF operations. In some embodiments, STLF checker 303 may be implemented as a conventional STLF buffer that performs associative lookups and implements a find-first algorithm. Thus, STLF checker 303 may compare the address of a load operation to the addresses of all store operations in the operation storage 307 of the load store unit 126. Once all matching entries 310 have been identified, the STLF checker 307 may employ a find-first algorithm to identify the entry 310 allocated to the youngest store operation that is older than the load operation. The data 319 from the identified entry 310 may then be selected as the value to be forwarded as the result of the load operation. The STLF checker 303 may take significantly more cycles to perform store-to-load forwarding than STLF buffer 305.

STLF checker 303 may accurately identify the correct source for data to be forwarded to a load operation. If STLF checker 303 and STLF buffer 305 identify the same store operation as the source from which to forward data as the result of a given load operation, then the data forwarded by the STLF buffer 305 as the result of the load operation may no longer be speculative and the load store unit may generate an indication to this effect. For example, a bit associated with the forwarded data may be cleared to indicate that the data is no longer speculative. If, on the other hand, STLF checker 303 identifies a different store operation than the one that was used to forward data from the STLF buffer 305, then the load operation and any subsequent operations that operated on the speculative data may have generated invalid results. The STLF checker 303 may also detect situations in which the STLF buffer 305 did not forward data as the result of a load operation, even though that load operation should have forwarded data from an earlier store operation.

The STLF checker 303 may cancel load operations that either incorrectly forwarded in STLF buffer 305 or which incorrectly did not forward in STLF buffer 305. In such situations, the STLF checker 303 may cause the load operation to be replayed (e.g., by providing a signal to the scheduler 118). The STLF checker 303 may also generate information identifying the store operation from which an incorrectly forwarded (or incorrectly non-forwarded) load operation should forward. When the load operation is replayed within the load store unit 126, the load store unit 126 may use this information to forward data from the store operation identified by the STLF checker 303 as the result of the load operation. Alternatively, the load store unit 126 may be configured to suppress result forwarding for load operations that the STLF checker 303 cancelled and caused to replay due to incorrect operation of STLF buffer 305.

Figure 3:
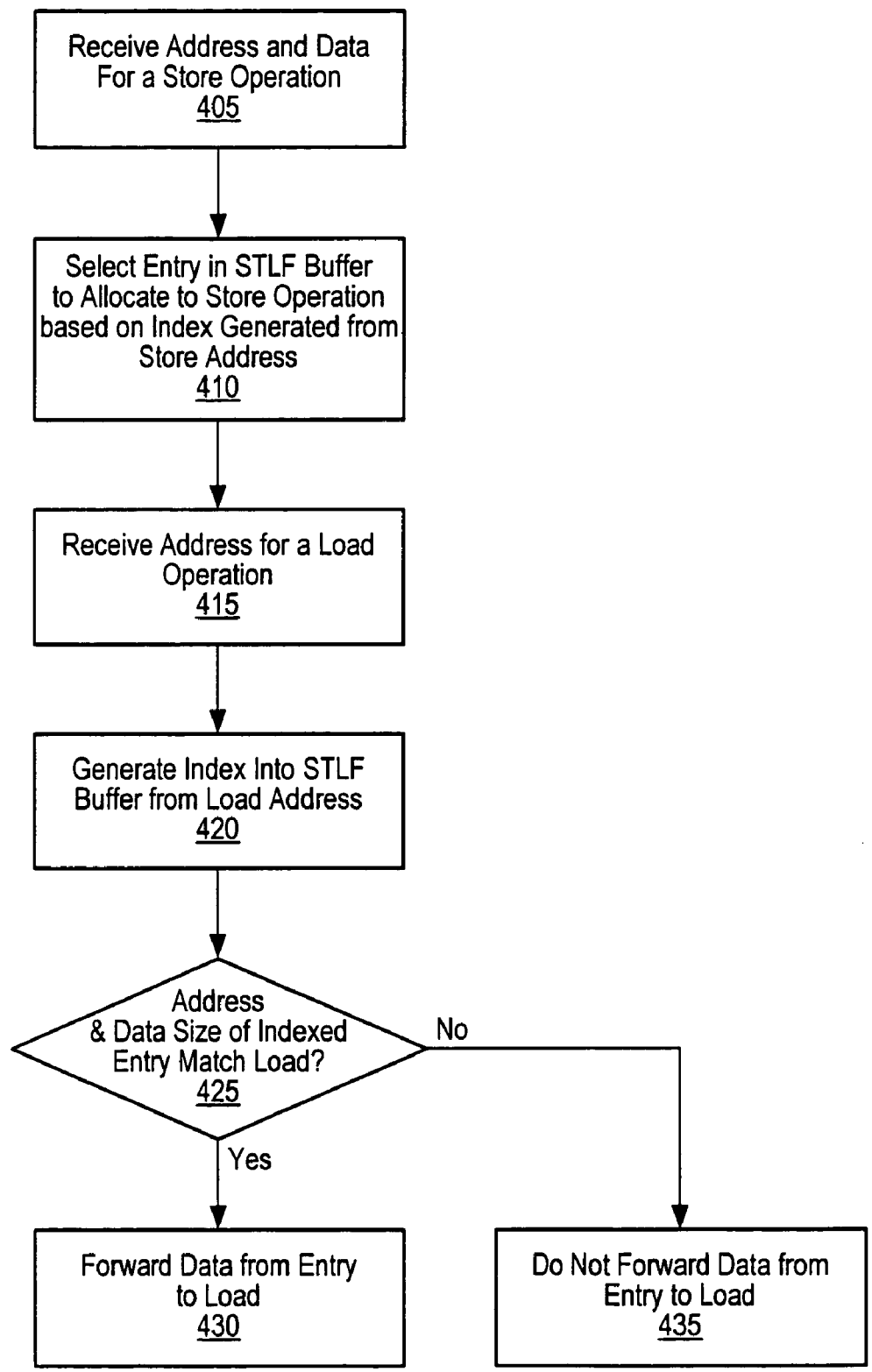
FIG. 3 is a flowchart of a method for operating a microprocessor including an STLF buffer, according to one embodiment.

FIG. 3 is a flowchart of a method for operating a microprocessor including a store-to-load forwarding buffer, according to one embodiment. When both the target address and associated data of a store operation are valid at 405, an entry in the store-to-load forwarding buffer may be selected for allocation to the store operation based on an index generated from all or part of the store operation's address and/or data size at 410. The selected entry may store all or part of the target address for the store operation (e.g., the entry may store a tag including the high-order bits of the target address not used to generate the index). The entry may also store the data associated with the store operation along with a value representing the size of the data.

When the address associated with a load operation is received at 415, the load store unit may generate an index into the STLF buffer based on the address at 420. If the entry selected by the index is valid, the load store unit may compare the address and data size of the entry with those of the load operation at 425. At 430, the data from the matching entry may be forwarded as the result of the load operation. If the address and/or data size of the selected entry do not match that of the load operation, no data may be forwarded as the result of the load.

Figure 4:
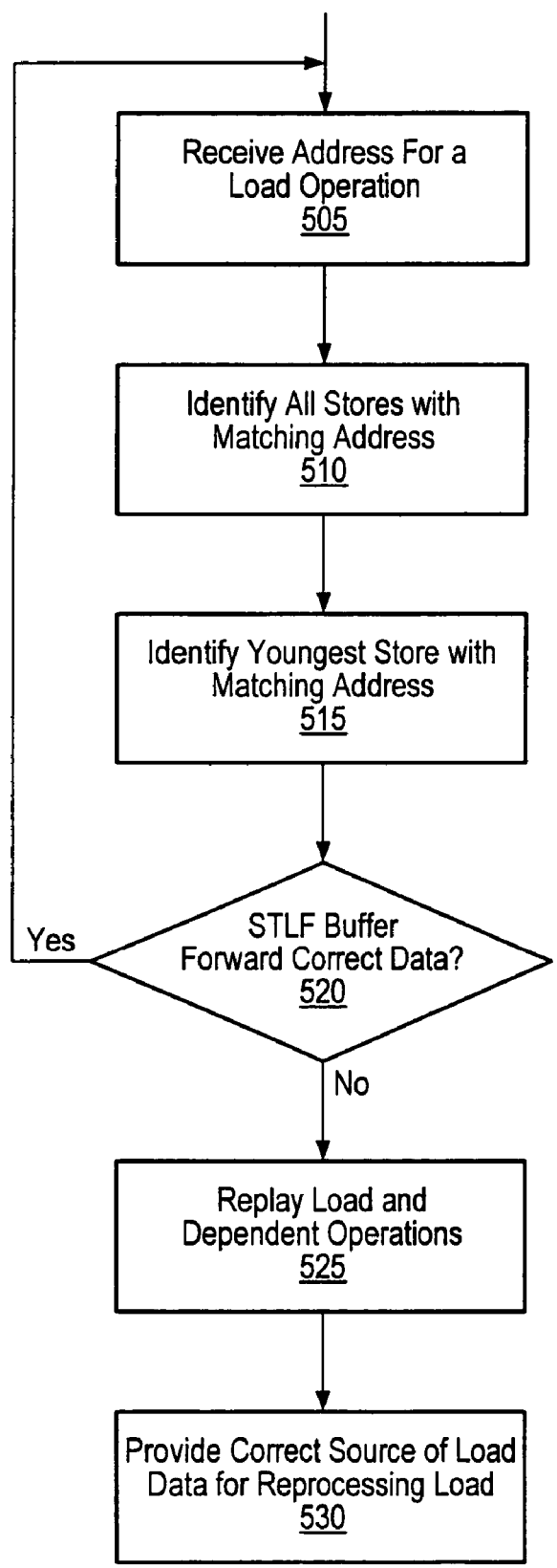
FIG. 4 is a flowchart of a method for operating a microprocessor that incorporates an STLF checker in addition to a store-to-load forwarding buffer, according to one embodiment.

FIG. 4 is a flowchart of a method for operating a microprocessor, which incorporates a STLF checker in addition to an indexed store-to-load forwarding buffer, according to one embodiment. When an address is received for a load operation at 505, coincidently with operations 420-435 of FIG. 3, the STLF checker may also begin searching within operation storage to identify all resident store operations with matching target addresses, at 510. From the group of store operations that are older than the load, the STLF checker may select the youngest as the correct source for data to forward to the load operation at 515. At 520, the load store unit may compare the store operation selected to forward data to the load operation from the STLF buffer (at 430) with the store operation identified by the STLF checker at 515. If data was forwarded to the load operation from any store operation other than the one identified by the STLF checker at 515, or if no data was forwarded to the load operation (at 435) and a matching store was identified by the STLF checker at 515, the load store unit may replay the load operation along with any subsequent operations, which were dependent upon the results of the load operation, at 525. In some embodiments, the load store unit may provide the identity of the store operation identified at 515 as the correct source for data to forward to the load for use in subsequent reprocessing of the load operation. In other embodiments, the load store unit may suppress store-to-load forwarding on subsequent reprocessing of the load operation.

Exemplary Computer Systems

Figure 5:
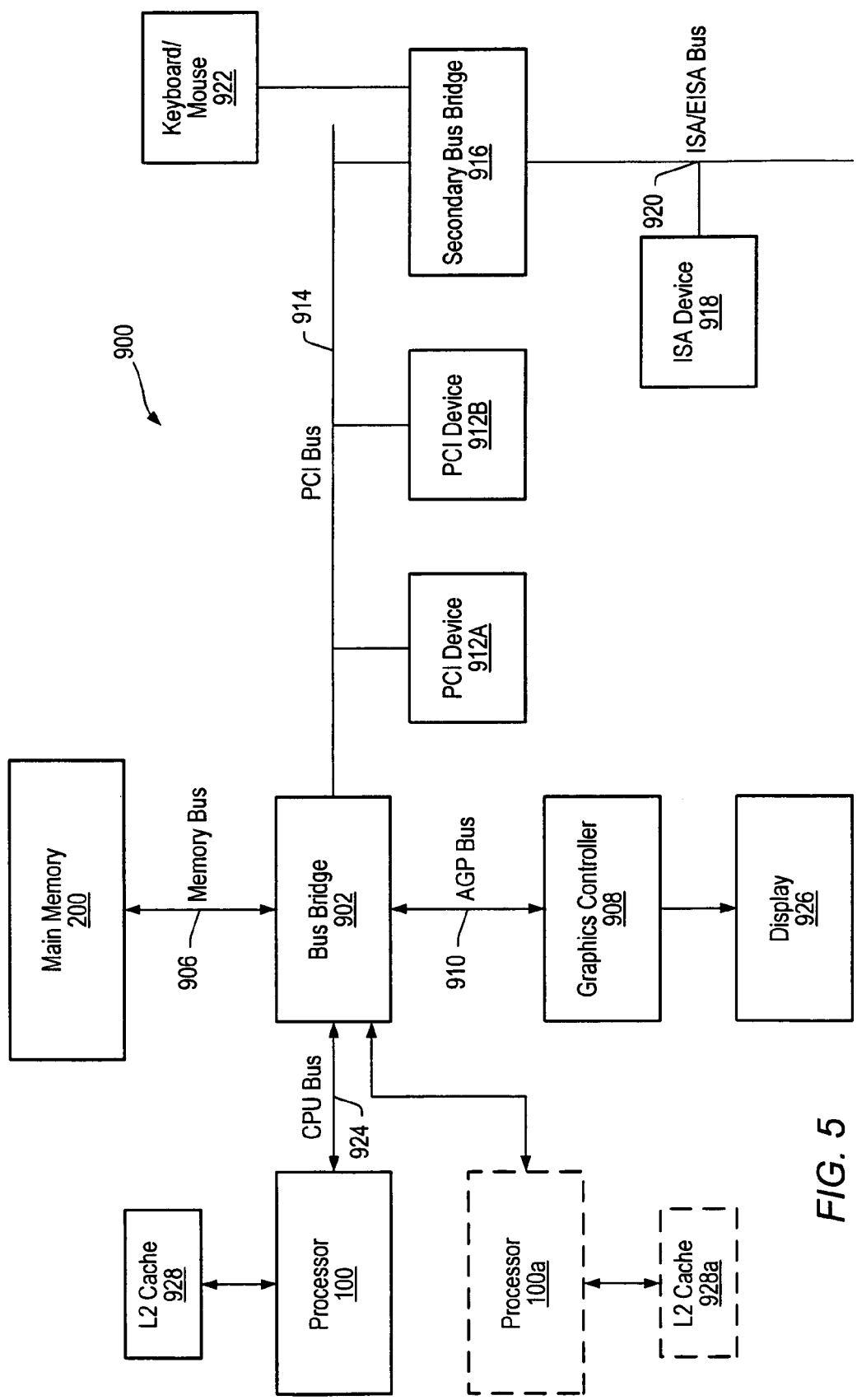
FIG. 5 shows an exemplary computer system incorporating a microprocessor having an STLF buffer, according to one embodiment.

FIG. 5 shows a block diagram of one embodiment of a computer system 900 that includes a microprocessor 100 coupled to a variety of system components through a bus bridge 902. Microprocessor 100 may include a load store unit including an STLF buffer 305 and checker 303 as described above. Other embodiments of a computer system are possible and contemplated. In the depicted system, a main memory 200 is coupled to bus bridge 902 through a memory bus 906, and a graphics controller 908 is coupled to bus bridge 902 through an AGP bus 910. Several PCI devices 912A-912B are coupled to bus bridge 902 through a PCI bus 914. A secondary bus bridge 916 may also be provided to accommodate an electrical interface to one or more EISA or ISA devices 918 through an EISA/ISA bus 920. In this example, microprocessor 100 is coupled to bus bridge 902 through a CPU bus 924 and to an optional L2 cache 928. In some embodiments, the microprocessor 100 may include an integrated L1 cache (not shown).

Bus bridge 902 provides an interface between microprocessor 100, main memory 200, graphics controller 908, and devices attached to PCI bus 914. When an operation is received from one of the devices connected to bus bridge 902, bus bridge 902 identifies the target of the operation (e.g., a particular device or, in the case of PCI bus 914, that the target is on PCI bus 914). Bus bridge 902 routes the operation to the targeted device. Bus bridge 902 generally translates an operation from the protocol used by the source device or bus to the protocol used by the target device or bus.

In addition to providing an interface to an ISA/EISA bus for PCI bus 914, secondary bus bridge 916 may incorporate additional functionality. An input/output controller (not shown), either external from or integrated with secondary bus bridge 916, may also be included within computer system 900 to provide operational support for a keyboard and mouse 922 and for various serial and parallel ports. An external cache unit (not shown) may also be coupled to CPU bus 924 between microprocessor 100 and bus bridge 902 in other embodiments. Alternatively, the external cache may be coupled to bus bridge 902 and cache control logic for the external cache may be integrated into bus bridge 902. L2 cache 928 is shown in a backside configuration to microprocessor 100. It is noted that L2 cache 928 may be separate from microprocessor 100, integrated into a cartridge (e.g., slot 1 or slot A) with microprocessor 100, or even integrated onto a semiconductor substrate with microprocessor 100.

Main memory 200 is a memory in which application programs are stored and from which microprocessor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 912A-912B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 918 is illustrative of various types of peripheral devices, such as a modem, a sound card, and a variety of data acquisition cards such as GPIB or field bus interface cards.

Graphics controller 908 is provided to control the rendering of text and images on a display 926. Graphics controller 908 may embody a typical graphics accelerator generally known in the art to render three-dimensional data structures that can be effectively shifted into and from main memory 200. Graphics controller 908 may therefore be a master of AGP bus 910 in that it can request and receive access to a target interface within bus bridge 902 to thereby obtain access to main memory 200. A dedicated graphics bus accommodates rapid retrieval of data from main memory 200. For certain operations, graphics controller 908 may further be configured to generate PCI protocol transactions on AGP bus 910. The AGP interface of bus bridge 902 may thus include functionality to support both AGP protocol transactions as well as PCI protocol target and initiator transactions. Display 926 is any electronic display upon which an image or text can be presented. A suitable display 926 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 900 may be a multiprocessing computer system including additional microprocessors (e.g., microprocessor 100*a* shown as an optional component of computer system 900). microprocessor 100*a* may be similar to microprocessor 100. More particularly, microprocessor 100*a* may be an identical copy of microprocessor 100. microprocessor 100*a* may be connected to bus bridge 902 via an independent bus (as shown in FIG. 5) or may share CPU bus 924 with microprocessor 100. Furthermore, microprocessor 100*a* may be coupled to an optional L2 cache 928*a* similar to L2 cache 928.

Figure 6:
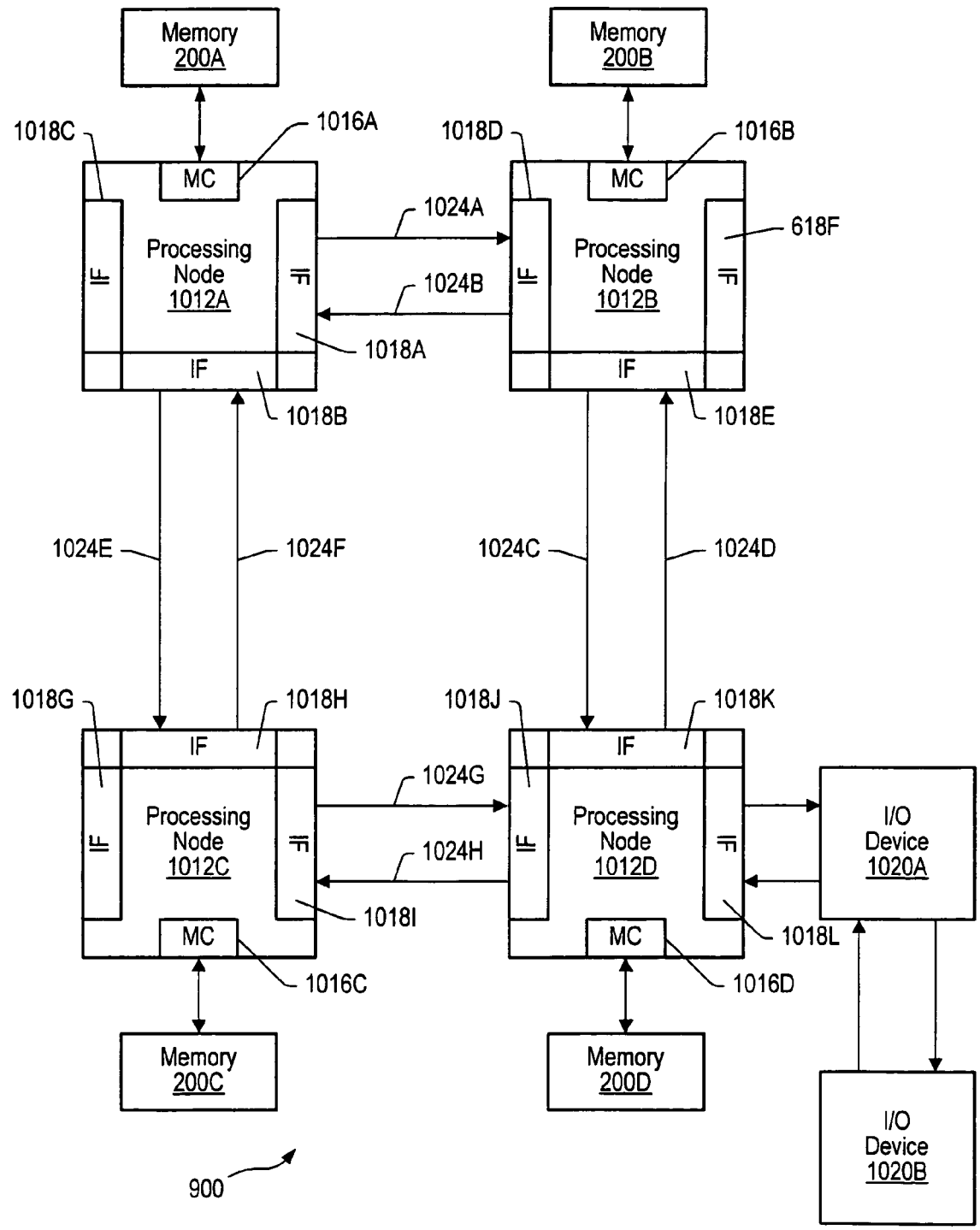
FIG. 6 shows an exemplary computer system, according to another embodiment.

Turning now to FIG. 6, another embodiment of a computer system 900 that may include a microprocessor 100 as described above is shown. Other embodiments are possible and contemplated. In the embodiment of FIG. 6, computer system 900 includes several processing nodes 1012A, 1012B, 1012C, and 1012D. Each processing node is coupled to a respective memory 200A-200D via a memory controller 1016A-1016D included within each respective processing node 1012A-1012D. Additionally, processing nodes 1012A-1012D include interface logic used to communicate between the processing nodes 1012A-1012D. For example, processing node 1012A includes interface logic 1018A for communicating with processing node 1012B, interface logic 1018B for communicating with processing node 1012C, and a third interface logic 1018C for communicating with yet another processing node (not shown). Similarly, processing node 1012B includes interface logic 1018D, 1018E, and 1018F; processing node 1012C includes interface logic 1018G, 1018H, and 10181; and processing node 1012D includes interface logic 1018J, 1018K, and 1018L. Processing node 1012D is coupled to communicate with a plurality of input/output devices (e.g., devices 1020A-1020B in a daisy chain configuration) via interface logic 1018L. Other processing nodes may communicate with other I/O devices in a similar fashion.

Processing nodes 1012A-1012D implement a packet-based link for inter-processing node communication. In the present embodiment, the link is implemented as sets of unidirectional lines (e.g., lines 1024A are used to transmit packets from processing node 1012A to processing node 1012B and lines 1024B are used to transmit packets from processing node 1012B to processing node 1012A). Other sets of lines 1024C-1024H are used to transmit packets between other processing nodes as illustrated in FIG. 6.

Generally, each set of lines 1024 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 1012A to processing node 1012D may pass through either processing node 1012B or processing node 1012C as shown in FIG. 6. Any suitable routing algorithm may be used. Other embodiments of computer system 900 may include more or fewer processing nodes then the embodiment shown in FIG. 6.

Generally, the packets may be transmitted as one or more bit times on the lines 1024 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 1012A-1012D, in addition to a memory controller and interface logic, may include one or more microprocessors. Broadly speaking, a processing node comprises at least one microprocessor and may optionally include a memory controller for communicating with a memory and other logic as desired. Each microprocessor may include a STLF buffer 305 and/or a STLF checker 303 in some embodiments. More particularly, each processing node 1012A-1012D may include one or more copies of microprocessor 100. External interface unit 1012D may include the interface logic 1018L within the node, as well as the memory controller 1016D.

Memories 200A-200D may comprise any suitable memory devices. For example, a memory 200A-200D may comprise one or more RAMBUS DRAMs (RDRAMs), synchronous DRAMs (SDRAMs), static RAM, etc. The address space of computer system 900 is divided among memories 200A-200D. Each processing node 1012A-1012D may include a memory map used to determine which addresses are mapped to which memories 200A-200D, and hence to which processing node 1012A-1012D a memory request for a particular address should be routed. In one embodiment, the coherency point for an address within computer system 900 is the memory controller 1016A-1016D coupled to the memory storing bytes corresponding to the address. In other words, the memory controller 1016A-1016D is responsible for ensuring that each memory access to the corresponding memory 200A-200D occurs in a cache coherent fashion. Memory controllers 1016A-1016D may comprise control circuitry for interfacing to memories 200A-200D. Additionally, memory controllers 1016A-1016D may include request queues for queuing memory requests.

Interface logic 1018A-1018L may comprise a variety of buffers for receiving packets from the link and for buffering packets to be transmitted upon the link. Computer system 900 may employ any suitable flow control mechanism for transmitting packets. For example, in one embodiment, each interface logic 1018 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 1020A-1020B may be any suitable I/O devices. For example, I/O devices 1020A-1020B may include devices for communicating with another computer system to which the devices may be coupled (e.g., network interface cards or modems). Furthermore, I/O devices 1020A-1020B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   a dispatch unit configured to dispatch load and store operations; and
   a load store unit configured to store information associated with load and store operations dispatched by the dispatch unit, wherein the load store unit includes an indexed STLF (Store-to-Load Forwarding) buffer, and wherein the indexed STLF buffer includes a plurality of entries each of which is selectable using a fixed index value unique to that entry;
   wherein the load store unit is further configured to:
      generate an index value dependent on at least a portion of an address of a load operation, wherein the generated index value is one of the fixed index values;
      index into the indexed STLF buffer using the generated index value to select one of the plurality of entries; and
      forward data included in the one of the plurality of entries selected by the generated index value as a result of the load operation.

2. The microprocessor of claim 1, wherein the load store unit is configured to not forward the data included in the one of the plurality of entries as the result of the load operation if information included in the one of the plurality of entries does not match information associated with the load operation.

3. The microprocessor of claim 1, wherein the one of the plurality of entries in the STLF buffer is configured to store an address, data, and a data size associated with a store operation.

4. The microprocessor of claim 1, wherein each of the plurality of entries in the STLF buffer has a capacity to store a maximum amount of data that can be written by a store operation.

5. The microprocessor of claim 1, wherein the load store unit is configured to select which one of the plurality of entries to allocate to a store operation by generating an additional index value dependent on at least a portion of an address of the store operation.

6. The microprocessor of claim 5, wherein the load store unit is configured to generate the additional index value dependent on both the at least a portion of the address of the store operation and a number of bytes of data operated on by the store operation, and wherein the load store unit is configured to generate the index value dependent on both the at least a portion of the address of the load operation and a number of bytes of data operated on by the load operation.

7. The microprocessor of claim 6, wherein the additional index value is generated by right-shifting a lower portion of the address targeted by the store operation by an amount equal to a logarithm in base two of the number of bytes of data operated on by the store operation.

8. The microprocessor of claim 5, wherein the additional index value comprises a portion of the address targeted by the store operation.

9. The microprocessor of claim 1, wherein the load store unit further comprises a STLF checker configured to verify correct operation of the STLF buffer in said forwarding data as a result of the load operation.

10. The microprocessor of claim 9, wherein the STLF checker is configured to perform an associative address comparison to identify all issued store operations targeting a same address as the load operation and to implement a find-first algorithm to select a youngest issued store operation that is older than the load operation.

11. The microprocessor of claim 9, wherein the STLF checker is configured to replay the load operation in response to the STLF checker identifying incorrect operation of the STLF buffer.

12. The microprocessor of claim 9, wherein the STLF checker is configured to replay one or more additional operations that are dependent on the load operation in response to the STLF checker detecting incorrect operation of the STLF buffer.

13. The microprocessor of claim 9, wherein the load store unit is configured to identify the result of the load operation as a speculative value in response to forwarding the data in the one of the plurality of entries included in the STLF buffer as the result of the load operation; wherein if the STLF checker verifies that the STLF buffer operated correctly for the load operation, the load store unit is configured to indicate that the result of the load operation is not speculative.

14. A computer system, comprising:
   a system memory; and
   a microprocessor coupled to the system memory, comprising:
      a dispatch unit configured to dispatch load and store operations; and
      a load store unit configured to store information associated with load and store operations dispatched by the dispatch unit, wherein the load store unit includes an indexed STLF (Store-to-Load Forwarding) buffer, and wherein the indexed STLF buffer includes a plurality of entries each of which is selectable using a fixed index value unique to that entry;

wherein the load store unit is further configured to:
generate an index value dependent on at least a portion of an address of a load operation, wherein the generated index value is one of the fixed index values;
index into the indexed STLF buffer using the generated index value to select one of the plurality of entries; and
forward data included in the one of the plurality of entries selected by the generated index value as a result of the load operation.

15. The computer system of claim 14, wherein the load store unit is configured to not forward the data included in the one of the plurality of entries as the result of the load operation if information included in the one of the plurality of entries does not match information associated with the load operation.

16. The computer system of claim 14, wherein the load store unit is configured to select which one of the plurality of entries to allocate to a store operation by generating an additional index value dependent on at least a portion of an address of the store operation.

17. The computer system of claim 16, wherein the load store unit is configured to generate the additional index value dependent on both the at least a portion of the address of the store operation and a number of bytes of data operated on by the store operation, and wherein the load store unit is configured to generate the index value dependent on both the at least a portion of the address of the load operation and a number of bytes of data operated on by the load operation.

18. The computer system of claim 14, wherein the load store unit further comprises a STLF checker configured to verify correct operation of the STLF buffer in said forwarding data as a result of the load operation.

19. The computer system of claim 18, wherein the STLF checker is configured to replay the load operation in response to the STLF checker identifying incorrect operation of the STLF buffer.

20. A method, comprising:
receiving an address of a load operation;
generating an index value corresponding to the address;
indexing into an indexed STLF (Store-to-Load Forwarding) buffer using the generated index value to select an entry from a plurality of entries included in the indexed STLF buffer, wherein each of the pluralities of entries is selectable using a fixed index value unique to that entry and the generated index value is one of the fixed index values; and
forwarding data included in the entry selected by the generated index value as a result of the load operation.

21. The method of claim 20, wherein said forwarding is dependent on information included in the entry matching information associated with the load operation.

22. The method of claim 20, further comprising the entry storing an address, data, and a data size associated with a store operation.

23. The method of claim 20, wherein each of the plurality of entries in the STLF buffer has a capacity to store a maximum amount of data that can be written by a store operation.

24. The method of claim 20, further comprising selecting which one of the plurality of entries to allocate to a store operation by generating an additional index value dependent on at least a portion of an address of the store operation.

25. The method of claim 24, wherein said generating the additional index value is dependent on both the at least a portion of the address of the store operation and a number of bytes of data operated on by the store operation, and wherein said generating the index value is dependent on both the at least a portion of the address of the load operation and a number of bytes of data operated on by the load operation.

26. The method of claim 25, wherein said generating the additional index value comprises right-shifting a lower portion of the address targeted by the store operation by an amount equal to a logarithm in base two of the number of bytes of data operated on by the store operation.

27. The method of claim 24, wherein the additional index value comprises a portion of the address targeted by the store operation.

28. The method of claim 20, further comprising verifying operation of the STLF buffer by performing an associative address comparison to identify all issued store operations targeting a same address as the load operation and implementing a find-first algorithm to select a youngest issued store operation that is older than the load operation.

29. The method of claim 28, further comprising replaying the load operation if said verifying identifies incorrect operation of the STLF buffer.

30. The method of claim 28, further comprising replaying one or more additional operations that are dependent on the load operation if said verifying detects incorrect operation of the STLF buffer.

31. The method of claim 28, further comprising:
identifying the result of the load operation as a speculative value in response to forwarding the data in the entry included in the STLF buffer as the result of the load operation; and
if said verifying verifies that the STLF buffer operated correctly for the load operation, indicating that the result of the load operation is not speculative.

* * * * *

UNITED STATES PATENT AND TRADEMARK OFFICE
CERTIFICATE OF CORRECTION

PATENT NO. : 7,321,964 B2 Page 1 of 1
APPLICATION NO. : 10/615101
DATED : January 22, 2008
INVENTOR(S) : Michael A. Filippo and James K. Pickett It is certified that error appears in the above-identified patent and that said Letters Patent is hereby corrected as shown below:

In the Claims:

Claim 1, column 13, line 49, between "value unique to that entry" and ";", please insert --, wherein the fixed index value used to select a particular entry does not depend on the contents of that entry--.

Claim 14, column 15, line 3, between "value unique to that entry" and ";", please insert --, wherein the fixed index value used to select a particular entry does not depend on the contents of that entry--.

Claim 20, column 13, line 51, between "index values" and ";", please insert --, wherein the fixed index value used to select a particular entry does not depend on the contents of that entry--.

Signed and Sealed this

Tenth Day of June, 2008

JON W. DUDAS
*Director of the United States Patent and Trademark Office*